United States Patent
Lee et al.

(10) Patent No.: US 10,411,768 B2
(45) Date of Patent: Sep. 10, 2019

(54) METHOD AND APPARATUS FOR TRANSMITTING AND RECEIVING FEEDBACK INFORMATION IN MOBILE COMMUNICATION SYSTEM BASED ON 2 DIMENSIONAL MASSIVE MIMO

(71) Applicant: Samsung Electronics Co., Ltd., Suwon-si, Gyeonggi-do (KR)

(72) Inventors: Hyo Jin Lee, Suwon-si (KR); Youn Sun Kim, Seongnam-si (KR); Ju Ho Lee, Suwon-si (KR); Young Bum Kim, Seoul (KR); Hyoung Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/882,652

(22) Filed: Jan. 29, 2018

(65) Prior Publication Data

US 2018/0167112 A1    Jun. 14, 2018

Related U.S. Application Data

(63) Continuation of application No. 14/454,560, filed on Aug. 7, 2014, now Pat. No. 9,882,616.

(30) Foreign Application Priority Data

Aug. 7, 2013    (KR) .................. 10-2013-0093388

(51) Int. Cl.
*H04B 7/06*    (2006.01)
*H04L 5/00*    (2006.01)
(Continued)

(52) U.S. Cl.
CPC ......... *H04B 7/0456* (2013.01); *H04B 7/0417* (2013.01); *H04B 7/0452* (2013.01);
(Continued)

(58) Field of Classification Search
CPC .. H04B 7/0413; H04B 7/0617; H04B 7/0456; H04B 7/0417; H04B 7/0639
See application file for complete search history.

(56) References Cited

U.S. PATENT DOCUMENTS

| | | |
|---|---|---|
| 2009/0046569 A1* | 2/2009 | Chen ............... H04L 1/0029 370/203 |
| 2016/0380734 A1* | 12/2016 | Wang ............... H04L 5/0057 370/329 |

FOREIGN PATENT DOCUMENTS

| | | |
|---|---|---|
| CN | 102315871 A | 1/2012 |
| CN | 102684850 A | 9/2012 |

OTHER PUBLICATIONS

Communication from a foreign patent office in a counterpart foreign application, State Intellectual Property Office of the People's Republic of China, "The First Office Action," Application No. CN 201480055337.0, dated August 27, 2018, 33 pages.

* cited by examiner

*Primary Examiner* — Shuwang Liu
*Assistant Examiner* — Gina M McKie

(57) ABSTRACT

A feedback information transmission/reception method for use in a mobile communication system is provided. The feedback information transmission method includes receiving configuration information on at least two reference signals and feedback configuration information for use in generating feedback information based on the at least two reference signals from a base station, receiving the at least two reference signals from the base station, measuring the at least two reference signals received, generating the feedback information based on the measurement result according to the feedback configuration information, and transmitting the feedback information to the base station.

20 Claims, 12 Drawing Sheets

(51) Int. Cl.
*H04W 24/10* (2009.01)
*H04B 7/0417* (2017.01)
*H04B 7/0452* (2017.01)
*H04B 7/0456* (2017.01)

(52) U.S. Cl.
CPC ......... *H04B 7/0469* (2013.01); *H04B 7/0617* (2013.01); *H04B 7/0632* (2013.01); *H04W 24/10* (2013.01); *H04B 7/063* (2013.01); *H04B 7/0639* (2013.01); *H04L 5/0023* (2013.01); *H04L 5/0048* (2013.01); *H04L 5/0057* (2013.01)

METHOD AND APPARATUS FOR TRANSMITTING AND RECEIVING FEEDBACK INFORMATION IN MOBILE COMMUNICATION SYSTEM BASED ON 2 DIMENSIONAL MASSIVE MIMO

CROSS-REFERENCE TO RELATED APPLICATION(S) AND CLAIM OF PRIORITY

This application is a continuation of U.S. application Ser. No. 14/454,560, filed Aug. 7, 2014, which claims foreign priority to Korean Patent Application No. 10-2013-0093388, filed on Aug. 7, 2013, this disclosures of which are hereby fully incorporated by reference for all purposes as if fully set forth herein.

TECHNICAL FIELD

The present disclosure relates to a wireless communication system and, in particular, to a channel state information transmission/reception method for a terminal to measure radio channel quality and report the measurement result to a base station in a wireless mobile communication system operating based on a multicarrier multiple access scheme such as Orthogonal Frequency Division Multiple Access (OFDMA).

BACKGROUND

The mobile communication system has evolved into a high-speed, high-quality wireless packet data communication system to provide data and multimedia services beyond the early voice-oriented services. In line with this tendency, the standardization organizations such as 3rd Generation Partnership Project (3GPP), 3GPP2, and Institute of Electrical and Electronics Engineers (IEEE) are standardizing 3G evolved mobile communication standards based on multicarrier multiple access scheme. The 3GPP Long Term Evolution (LTE), 3GPP2 Ultra Mobile Broadband (UMB), and IEEE 802.16m are the mobile communication standards that have been developed to support high speed high quality wireless packet data communication services based on the multicarrier multiple access scheme.

Existing 3G evolved mobile communication standards such as LTE, UMB, and IEEE 802.16m based on the multicarrier multiple access scheme are characterized by various techniques including Multiple Input Multiple Output (MIMO), beamforming, Adaptive Modulation and Coding (AMC), channel sensitive scheduling, etc. for improving transmission efficiency. Such techniques are capable of concentrating transmission power with multiple antennas or adjusting transmission data amount depending on the channel quality and transmitting data to the user with good channel quality selectively, resulting in improvement of transmission efficiency and increase of system throughput.

Because most of these techniques operate based on the channel state information between an evolved Node B (eNB) (or Base Station (BS)) and a User Equipment (UE) (or Mobile Station (MS)), the eNB or UE has to measure the channel state between the eNB and UE based on Channel State Indication Reference Signal (CSI-RS). The eNB is a transmitter in downlink and a receiver in uplink and capable of managing a plurality cells for communication. A mobile communication system is made up of a plurality of eNBs distributed geographically, and each eNB manages a plurality of cells to provide the UEs with communication service.

Existing 3G and 4G mobile communication systems represented by LTE/LTE-A adopt MIMO technique using a plurality transmission/receive antennas to increase data rate and system throughput. Using a MIMO scheme, it is possible to transmit a plurality of information streams separated spatially. This technique of transmitting the plural information streams is referred to as spatial multiplexing. Typically, the number of information streams to be spatially multiplexed is determined depending on the numbers of antennas of the transmitter and receiver. The number of information streams that can be spatially multiplexed is referred to as rank of the corresponding transmission. The LTE/LTE-A Release 11 supports 8×8 MIMO spatial multiplexing and up to rank 8.

The Full Dimension MIMO (FD-MIMO) system to which the method proposed in the present disclosure is applied is capable of using 32 or more transmit antennas with the evolvement of the legacy LTE/LTE-A MIMO scheme supporting up to 8 antennas.

The FD-MIMO system is the wireless communication system capable of transmitting data using a few dozen or more of transmit antennas.

FIG. 1 illustrates an example FD-MIMO system.

Referring to FIG. 1, the base station transmitter 100 transmits radio signals 120 and 130 through a few dozen or more transmit antennas. The transmit antennas 110 are arranged at minimum distance among each other. The minimum distance may be half of the wavelength (?/2). Typically, in the case that the transmit antennas are arranged at the distance of half of the wavelength of the radio signal, the signals transmitted by the respective transmit antennas are influenced by radio channel with low correlation. Assuming the radio signal band of 2 GH, this distance is 7.5 cm and shortened as the band becomes higher than 2 GHz.

In FIG. 1, a few dozen or more transmit antennas 110 arranged at the base station are used to transmit signals to one or more terminals as denoted by reference number 120 and 130. In order to transmit signals to plural terminals simultaneously, an appropriated precoding is applied. At this time, one terminal may receive plural information streams. Typically, a number of information streams which a terminal can receive is determined depending on the number of receive antenna of the terminal, channel state, and reception capability of the terminal.

In order to implement the FD-MIMO system efficiently, the terminal has to measure the channel condition and interference size accurately and transmit the channel state information to the base station efficiently. If the channel state information is received, the base station determines the terminals for downlink transmission, downlink data rate, and precoding to be applied. In the case of FD-MIMO system using large number of transmit antennas, if the channel state information transmission method of the legacy LTE/LTE-A system is applied without modification, the control information amount to be transmitted in uplink increases significantly, resulting in uplink overhead.

The mobile communication system is restricted in resource such as time, frequency, and transmission power. Accordingly, if the resource allocated for reference signal increases, the resource amount to be allocated for data traffic channel transmission decreases, resulting in reduction of absolute data transmission amount. In this case, although the channel estimation and measurement performance are improved, the data transmission amount decreases, resulting in reduction of entire system throughput.

Thus, there is a need of allocating the resources for reference signal and traffic channel transmissions efficiently in order to maximize the entire system throughput.

FIG. 2 illustrates an example time-frequency grid a single Resource Block (RB) of a downlink subframe as a smallest scheduling unit in the LTE/LTE-A system.

As shown in FIG. 2, the radio resource is of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE).

The radio resource structured as shown in FIG. 2 can be used for transmitting plural different types of signals as follows.

1. CRS (Cell-specific Reference Signal): reference signal transmitted to all the UEs within a cell
2. DMRS (Demodulation Reference Signal): reference signal transmitted to a specific UE
3. PDSCH (Physical Downlink Shared Channel): data channel transmitted in downlink which the eNB use to transmit data to the UE and mapped to REs not used for reference signal transmission in data region of FIG. 2
4. CSI-RS (Channel state information Reference Signal): reference signal transmitted to the UEs within a cell and used for channel state measurement. Multiple CSI-RSs can be transmitted within a cell.
5. Other control channels (PHICH, PCFICH, PDCCH): channels for providing control channel necessary for the UE to receive PDCCH and transmitting ACK/NACK of HARQ operation for uplink data transmission.

In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource in general. In the LTE-A system, the zero power CSI-RS is referred to as muting. The zero power CSI-RS (muting) by nature is mapped to the CSI-RS position without transmission power allocation.

In FIG. 2, the CSI-RS can be transmitted at some of the positions marked by A, B, C, D, E, F, G, H, I, and J according to the number of number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, entire of the specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, muting cannot be applied to one pattern partially.

In the case of transmitting CSI-RSs of two antenna ports, the CSI-RSs are mapped to two consecutive REs in the time domain and distinguished from each other using orthogonal codes. In the case of transmitting CSI-RSs of four antenna ports, the CSI-RSs are mapped in the same way of mapping the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In the LTE-A system, the UE feeds back the information on the downlink channel state for use in downlink scheduling of the eNB. That is, the UE measures the reference signal transmitted by the eNB in downlink and feeds back the information estimated from the reference signal to the eNB in the format defined in LTE/LTE-A standard. In LTE/LTE-A, the UE feedback information includes the following three indicators:

1. Rank Indicator (RI): number of spatial layers that can be supported by the current channel experienced at the UE.
2. Precoding Matrix Indicator (PMI): precoding matrix recommended by the current channel experienced at the UE.
3. Channel Quality Indicator (CQI): maximum possible data rate that the UE can receive signal in the current channel state. CQI may be replaced with the SINR, maximum error correction code rate and modulation scheme, or per-frequency data efficiency that can be used in similar way to the maximum data rate.

The RI, PMI, and CQI are associated among each other in meaning. For example, the precoding matrix supported in LTE/LTE-A is configured differently per rank. Accordingly, the PMI value 'X' is interpreted differently for the cases of RI set to 1 and RI set to 2. Also, when determining CQI, the UE assumes that the PMI and RI which the UE has reported are applied by the eNB. That is, if the UE reports RI_X, PMI_Y, and CQI_Z; this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, the UE is configured with one of the following four feedback or reporting modes depending on the information to be included therein:

1. Mode 1-0: RI, wideband CQI (wCQI)
2. Mode 1-1: RI, wCQI, wideband PMI (wPMI)
3. Mode 2-0: RI, wCQI, subband CQI (sCQI)
4. Mode 2-1: RI, wCQI, wPMI, sCQI, sPMI The feedback timing in the respective feedback mode is determined based on $I_{CQI/PMI}$ transmitted through high layer signaling and $N_{pd}$, $N_{OFFSET,CQI}$, $M_{RI}$, $N_{OFFSET,RI}$ corresponding to $I_{RI}$. In Mode 1-0, the wCQI transmission period is $N_{pd}$, and the feedback timing is determined based on the subframe offset value of $N_{OFFSET,CQI}$. The RI transmission period is $N_{pd} \cdot M_{RI}$, and RI transmission period offset is $N_{OFFSET,CQI} + N_{OFFSET,RI}$.

FIG. 3 illustrates example feedback timings of RI and wCQI in the case of $N_{pd}=2$, $M_{RI}=2$, $N_{OFFSET,CQI}=1$, and $N_{OFFSET,RI}=-1$. Here, the each timing is indicated by subframe index.

Here, the feedback mode 1-1 has the same timings as the feedback mode 1-0 with the exception that PMI is transmitted at the wCQI transmission timing together.

In the feedback mode 2-0, the sCQI feedback period is $N_{pd}$ with offset $N_{OFFSET,CQI}$. The wCQI feedback period is $H \cdot N_{pd}$ with offset $N_{OFFSET,CQI}$ equal to the sCQI offset. Here, $H = J \cdot K + 1$ where K is transmitted through higher layer signal and J is determined according to the system bandwidth.

For example, J is determined as 3 in the 10 MHz system. This means that wCQI is transmitted at every H sCQI transmissions in replacement of sCQI. The RI period $M_{RI} \cdot H \cdot N_{pd}$ with offset $N_{OFFSET,CQI} + N_{OFFSET,RI}$ FIG. 4 illustrates example feedback timings of RI, sCQI, and wCQI in the case of $N_{pd}=2$, $M_{RI}=2$, J=3 (10 MHz), K=1, $N_{OFFSET,CQI}=1$, and $N_{OFFSET,RI}=-1$.

The feedback mode 2-1 is identical with the feedback mode 2-0 in feedback timings with the exception that PMI is transmitted at the wCQI transmission timings together.

Unlike the feedback timings for the case of 4 CSI-RS antenna ports as described above, two PMIs have to be transmitted for 8 CSI-RS antenna ports. For 8 CSI-RS antenna ports, the feedback mode 1-1 is divided into two sub-modes. In the first sub-mode, the first PMI is transmitted along with RI and the second PMI along with wCQI. Here, the wCQI and second PMI feedback period and offset are defined as $N_{pd}$ and $N_{OFFSET,CQI}$, and the RI and first PMI feedback period and offset are defined as $M_{RI} \cdot N_{pd}$ and $N_{OFFSET,CQI} + N_{OFFSET,RI}$, respectively. If the precoding matrix indicated by the first PMI is W1 and the precoding matrix indicated by the second PMI is W2, the UE and the eNB share the information on the UE-preferred precoding matrix of W1W2.

For the 8 CSI-RS antenna ports, the feedback mode 2-1 adopts new information of Precoding Type Indicator (PTI) which is transmitted along with RI at period of $M_{RI} \cdot H \cdot N_{pd}$ with the offset of $N_{OFFSET,CQI} + N_{OFFSET,RI}$. For PTI=0, the first and second PMIs and wCQI are transmitted, particularly the wCQI and second PMI at the same timing at a period $N_{pd}$ with an offset of $N_{OFFSET,CQI}$. Meanwhile, the first PMI is transmitted at a period of $H' \cdot N_{pd}$ with an offset of $N_{OFFSET,CQI}$. Here, H' is transmitted through higher layer signaling. For PTI=1, the PTI and RI are transmitted at the same timing, the wCQI and second PMI are transmitted at the same timing, and sCQI is transmitted additionally. In this case, the first PMI is not transmitted. The PTI and RI are transmitted at same period with the same offset as the case of PTI=0, and sCQI is transmitted at a period of $N_{pd}$ with an offset of $N_{OFFSET,CQI}$. Also, the wCQI and second PMI are transmitted at a period of $H \cdot N_{pd}$ with an offset of $N_{OFFSET,CQI}$, and H is set to the same value as the case of 4 CSI-RS antenna ports.

FIGS. 5 and 6 illustrate example feedback timings for PTI=0 and PTI=1 with $N_{pd}=2$, $M_{RI}=2$, J=3 (10 MHz), K=1, H'=3, $N_{OFFSET,CQI}=1$, and $N_{OFFSET,RI}=-1$, respectively.

Typically, in the FD-MIMO using a plurality of transmit antennas, the number of CSI-RSs has to increases in proportion to the number of transmit antennas. In an exemplary case of LTE/LTE-A using 8 transmit antennas, the eNB has to transmit CSI-RSs of 8 ports to the UE for downlink channel state measurement. At this time, in order to transmit 8-port CSI-RSs, 8 REs has to be allocated for CSI-RS transmission in one RB as marked by A and B in FIG. 2. In the case of applying CSI-RS transmission scheme of LTE/LTE-A to FD-MIMO, the CSI-RS transmission resource increases in proportion to the number of transmit antenna. That is, the eNB having 128 transmit antennas has to transmit CSI-RS on 128 REs in one RB. Such a CSI-RS transmission scheme consumes excessive radio resources and thus causes shortage of resource for data transmission.

SUMMARY

To address the above-discussed deficiencies, it is a primary object to provide a method and apparatus for a UE to measure reference signals, generate channel state information, and transmit the channel state information for efficient data transmission/reception in the LTE-A system operating in the DS-MIMO mode. Also, the present disclosure provides a method and apparatus for an eNB to transmit the reference signals to the UE and receive the channel state information transmitted by the UE.

In accordance with an aspect of the present disclosure, a feedback information transmission method of a terminal in a mobile communication system is provided. The feedback information transmission method includes receiving configuration information on at least two reference signals and feedback configuration information for use in generating feedback information based on the at least two reference signals from a base station, receiving the at least two reference signals from the base station, measuring the at least two reference signals received, generating the feedback information based on the measurement result according to the feedback configuration information, and transmitting the feedback information to the base station.

In accordance with another aspect of the present disclosure, a feedback information reception method of a base station in a mobile communication system is provided. The feedback information reception method includes transmitting configuration information on at least two reference signals and feedback configuration information for use in generating feedback information based on the at least two reference signals to a terminal, transmitting the at least two reference signals to the terminal, and receiving the feedback information generated based on the feedback configuration information from the terminal.

In accordance with another aspect of the present disclosure, a terminal for transmitting feedback information in a mobile communication system is provided. The terminal includes a communication unit which is responsible for data communication with a base station and a controller which controls the communication unit to receive configuration information on at least two reference signals and feedback configuration information for use in generating feedback information based on the at least two reference signals from a base station and, afterward, receiving the at least two reference signals from the base station, measures the at least two reference signals received, generates the feedback information based on the measurement result according to the feedback configuration information, and controls the communication unit to transmit the feedback information to the base station.

In accordance with still another aspect of the present disclosure, a base station for receiving feedback information in a mobile communication system is provided. The base station includes a communication unit which is responsible for data communication with a terminal and a communication unit which controls the communication unit to transmit configuration information on at least two reference signals and feedback configuration information for use in generating feedback information based on the at least two reference signals to a terminal and, afterward, the at least two reference signals to the terminal and to receive the feedback information generated based on the feedback configuration information from the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 7 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Exemplary embodiments of the present disclosure are described with reference to the accompanying drawings in detail. Detailed description of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Although the description is directed to the OFDM-based radio communication system, particularly the 3GPP Evolved Universal Terrestrial Radio Access (E-UTRA), it will be understood by those skilled in the art that the present disclosure can be applied even to other communication systems having the similar technical background and channel format, with a slight modification, without departing from the spirit and scope of the present disclosure.

Figure 1:
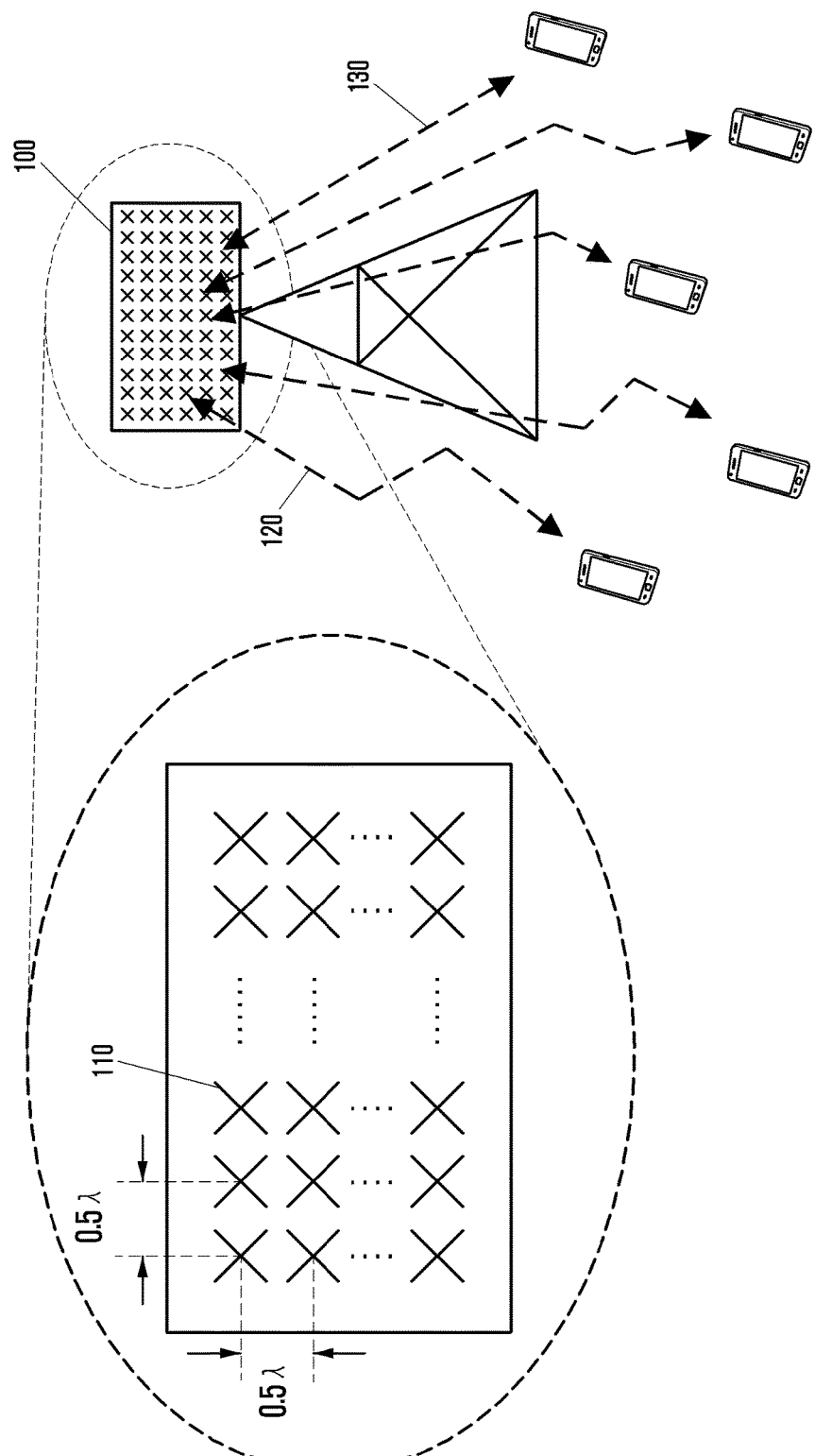
FIG. 1 illustrates an example FD-MIMO system.
Figure 2:
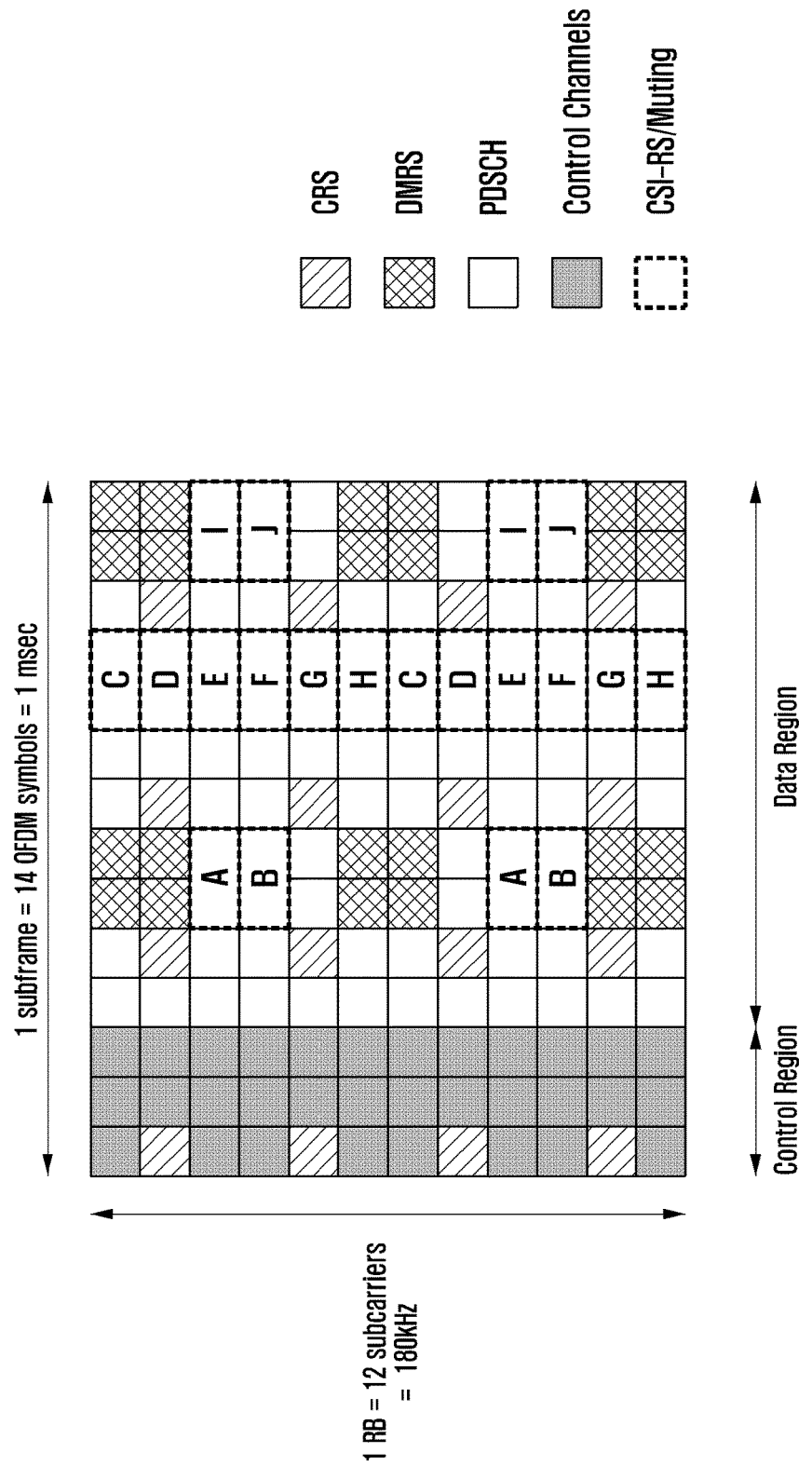
FIG. 2 an example time-frequency grid with a single Resource Block (RB) of a downlink subframe as a smallest scheduling unit in the LTE/LTE-A system.

In order to make it possible for the UE to measure the channels of the plural transmit antennas while preventing the eNB having a plurality of transmit antennas like FD-MIMO from allocating excessively large amount of radio resource for CSI-RS transmission, the eNB can be configured to transmit CSI-RSs in N dimensions. In an exemplary case that the transmit antennas of the eNB is arranged in 2 dimensions as shown in FIG. 2, it is possible to transmit CSI-RSs in 2 dimensions separately.

According to this principle, the reference signals transmitted from the eNB to the UE may be classified into the first CSI-RS and second CSI-RS. According to an embodiment of the present disclosure, the two types of reference signals are sorted may be differentiated between horizontal direction and vertical direction such that one CSI-RS is used for horizontal direction channel information (horizontal CSI-RS) and the other for vertical direction channel information (vertical CSI-RS). Although it is not mandatory to classify the reference signals into the horizontal and vertical components for implementing the present disclosure, the description is made under the assumption that the reference signals are classified into horizontal CSI-RS and vertical CSI-RS for simplifying the explanation.

Figure 7:
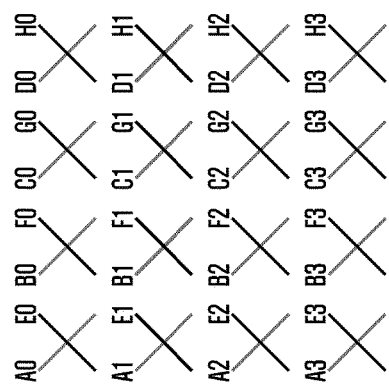
FIG. 7 illustrates a mechanism of CSI-RS transmission in FD-MIMO system according to an embodiment of the present disclosure.
Figure 7:
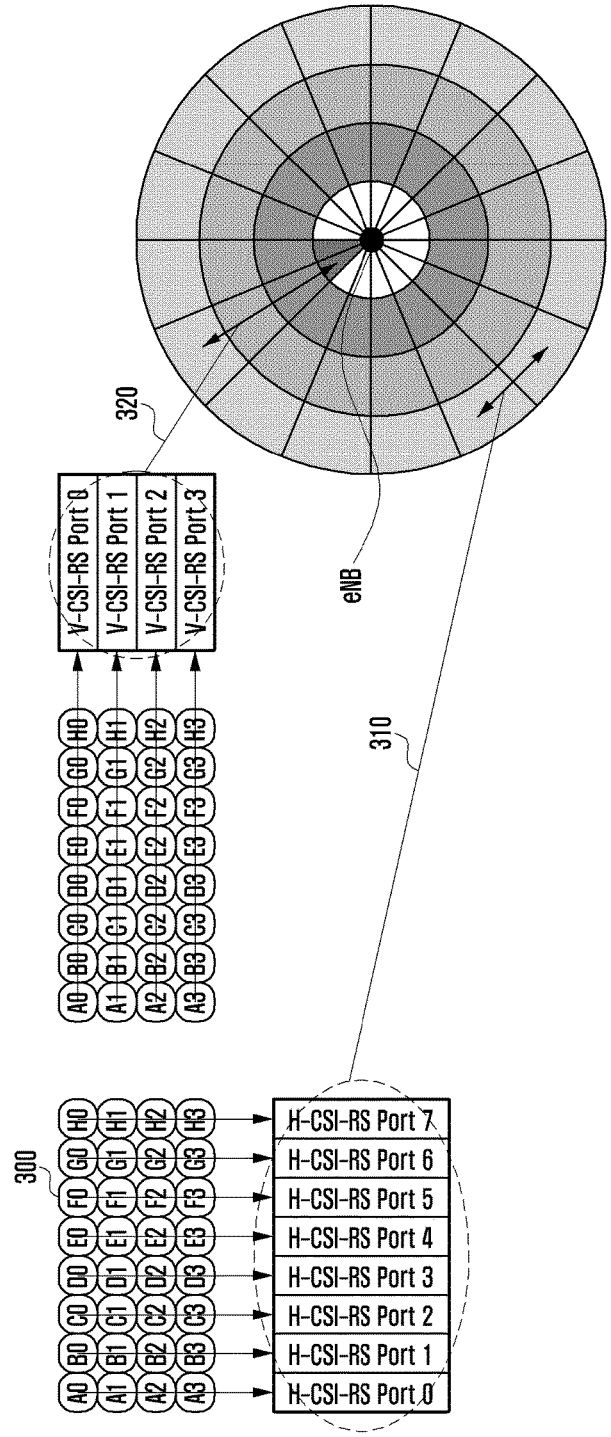

FIG. 7 illustrates a mechanism of CSI-RS transmission in FD-MIMO system according to an embodiment of the present disclosure.

Referring to FIG. 7, the eNB operating in FD-MIMO mode according to an embodiment of the present disclosure is provided with total 32 antennas. Among them, 16 antennas (A0, . . . A3, B0, . . . B3, C0, . . . C3, D0, . . . D3) are arranged at an angle of −45° to the negative direction of the X axis, and the other 16 antennas (E0, . . . E3, F0, . . . F3, G0, . . . F3, H0, . . . H3) are arranged at an angle of +45° to the positive direction of the X axis. The antenna formation in which N/2 antennas and the rest N/2 antennas are arranged to form an angle of 90 degrees at the position is referred to XPOL. The XPOL is used to obtain high antenna gain by arranging a plurality of antenna within a small space.

In the case of XPOL, the first antenna group of N/2 antennas having the same direction and the second antenna group of rest N/2 antennas are arranged at the same position such that the radio channels formed by the respective antenna groups differ in phase from each other. That is, assuming that $N_{Rx} \times 16$ channel matrix between the first antenna group and the UE is $H_1$ ($N_{Rx}$ is the number of receive antennas), the channel matrix $H_2$ between the second antenna group and the UE can be expressed as a scalar product of $H_1$ as equation (1).

$$H_2 = e^{j\Phi} H_1 \qquad (1)$$

Here, (i, j) component of $H_k$ denotes the channel n from the $j^{th}$ transmit antenna to the $i^{th}$ receive antenna in the $k^{th}$ antenna group.

Figure 3:
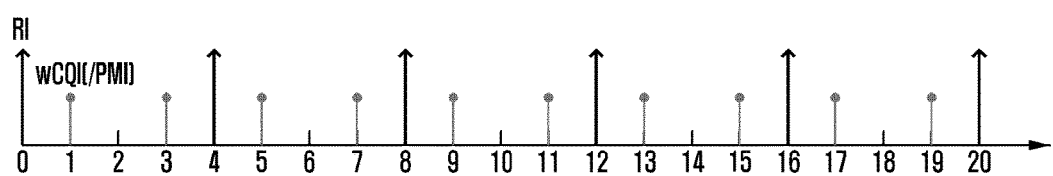
FIGS. 3 to 6 illustrate example timing diagrams for feedback timings in the LTE/LTE-A system.
Figure 4:
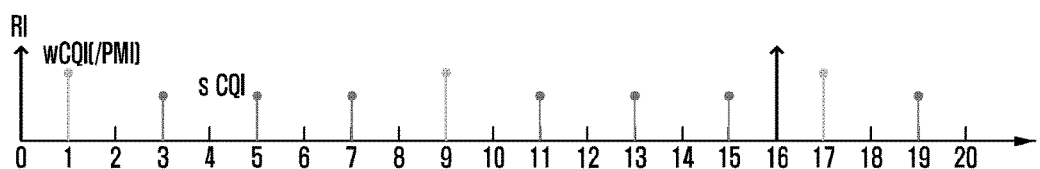
Figure 5:
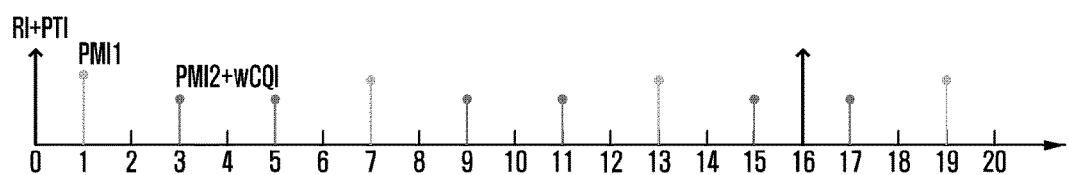
Figure 6:
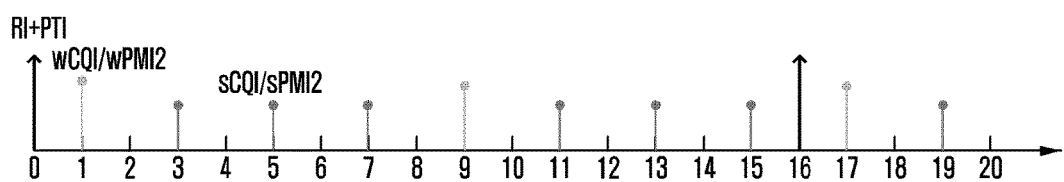

In FIG. 3, the 32 antennas 300 are indicated by A0, . . . , A3, B0, . . . . B3, C0, . . . , C3, D0, . . . , D3, E0, . . . , E3, F0, . . . , F3, G0, . . . , G3, and H0, . . . , H3. Two CSI-RSs are transmitted through the 32 antennas.

The antenna ports corresponding to H-CSI-RS for use in measuring horizontal channel state consist of the following 8 antenna ports.

1. H-CSI-RS port 0: group of antennas A0, A1, A2, and A3
2. H-CSI-RS port 1: group of antennas B0, B1, B2, and B3
3. H-CSI-RS port 2: group of antennas C0, C1, C2, and C3
4. H-CSI-RS port 3: group of antennas D0, D1, D2, and D3
5. H-CSI-RS port 4: group of antennas E0, E1, E2, and E3
6. H-CSI-RS port 5: group of antennas F0, F1, F2, and F3
7. H-CSI-RS port 6: group of antennas G0, G1, G2, and G3
8. H-CSI-RS port 7: group of antennas H0, H1, H2, and H3

Grouping plural antennas into one CSI-RS port means antenna virtualization which is implemented through linear combination of plural antennas.

The antenna ports corresponding to V-CSI-RS for use in measuring vertical channel state include the following 4 antenna ports.

1. V-CSI-RS port 0: group of antennas A0, B0, C0, D0, E0, F0, G0, and H0
2. V-CSI-RS port 1: group of antennas A1, B1, C1, D1, E1, F1, G1, and H1
3. V-CSI-RS port 2: group of antennas A2, B2, C2, D2, E2, F2, G2, and H2
4. V-CSI-RS port 3: group of antennas A3, B3, C3, D3, E3, F3, G3, and H3

In the case that a plurality of antenna are arranged 2-dimensionally in an M×N (vertical direction×horizontal direction) matrix, the FD-MIMO channels may be measured using N horizontal direction CSI-RS ports and M CSI-RS ports. That is, when using two CSI-RSs, M+N CSI-RS ports may be required for checking the channel state for M×N transmit antennas. It is advantageous to use relatively small number of CSI-RS ports for checking the information on the relatively large number of the transmit antennas in reducing CSI-RS overhead. In the above case, the channel information on the FD-MIMO transmit antennas is acquired using two CSI-RSs, and this approach can be applied to the case of using K CSI-RSs in the same manner.

In FIG. 7, the 32 transmit antennas are mapped to 8 H-CSI-RS ports and 4 V-CSI-RS ports in order for the UE to measure the radio channels of the FD-MIMO system based thereon. The H-CSI-RS may be used for estimating the horizontal angle between the UE and the eNB transmit antennas as denoted by reference number 310, while the V-CSI-RS may be used for estimating the vertical angle between the UE and the eNB transmit antennas as denoted by reference number 320.

The UE measures the channels based on the plural CSI-RSs and transmit RI, PMI, and CQI generated using the measurement result to the eNB so as to notify the eNB of the radio channels of the FD-MIMO system.

Figure 8:
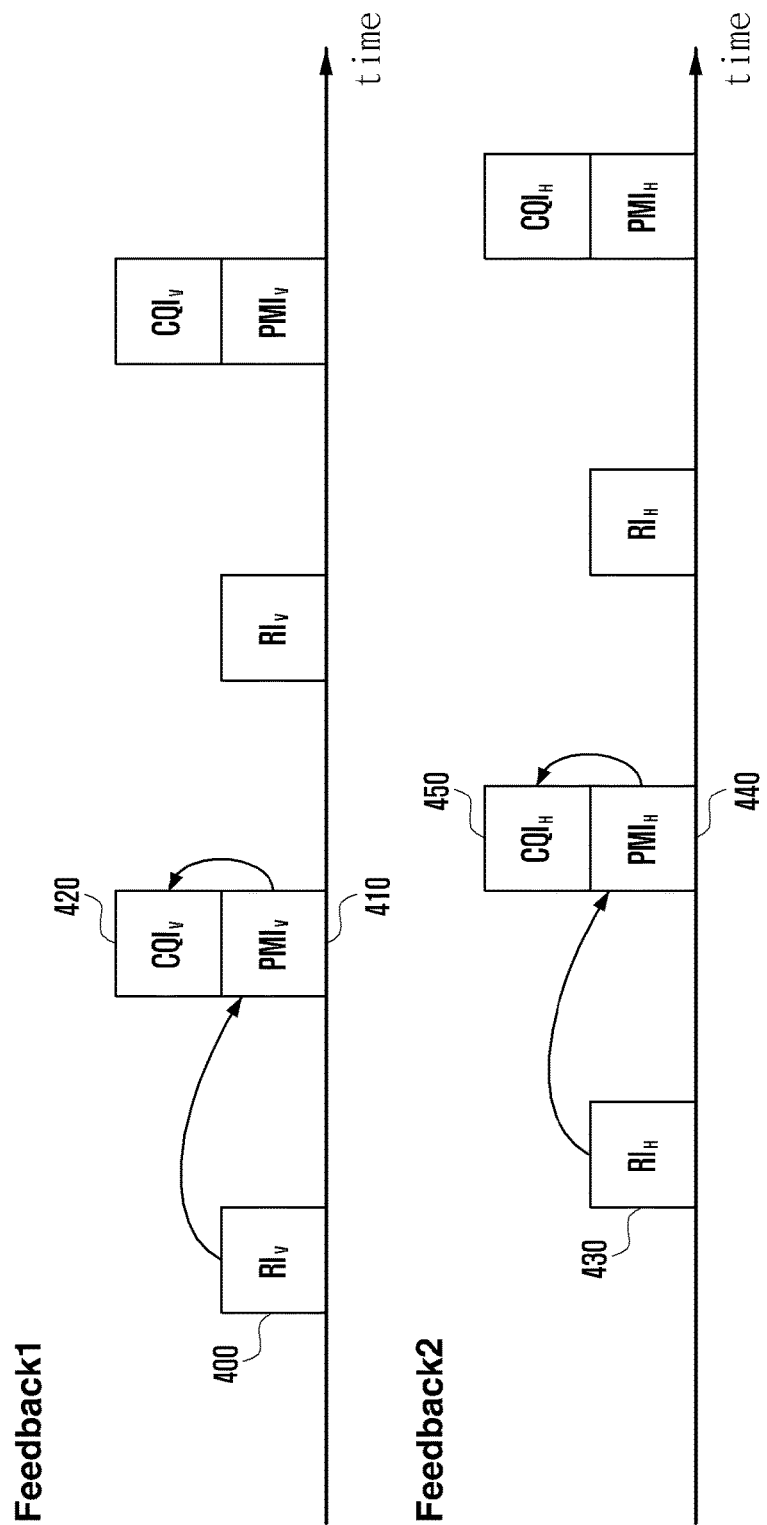
FIG. 8 illustrates feedbacks of RI, PMI, and CQI based on two CSI-RS in the feedback method according to an embodiment of the present disclosure.

FIG. 8 illustrates feedbacks of RI, PMI, and CQI based on two CSI-RS in the feedback method according to an embodiment of the present disclosure.

In FIG. 8, the UE is assigned the first feedback information (feedback 1) and the second feedback information (feedback 2) for as independent feedback information for V-CSI-RS and H-CSI-RS. That is, the UE measures the V-CSI-RS to feed back the channel state information of feedback 1 and measures the H-CSI-RS to feed back the channel state information of feedback 2.

The RI, PMI, and CQI are transmitted in the state of being correlated among each other. In the case of feedback 1, the RIV informs of the rank of the precoding matrix indicated by the PMIV. Also, CQIV indicates the data rate supported by the UE or the value corresponding thereto in the case that the eNB precoding matrix of the corresponding rank which is indicated by PMIV when the eNB performs transmission at the rank indicated by RIV. Like feedback 1, the RI, PMI, and CQI are transmitted in the state of being correlated among each other in feedback 2.

In the in the feedback method as shown in FIG. 8, the UE is allocated feedback resources for FD-MIMO as follows.

First, the UE is allocated two CSI-RS resources {CSI-RS-1, CSI-RS-2} from the eNB. That is, the UE receives two CSI-RSs from the eNB for channel measurement. At this time, the UE may have no capability of checking whether the two CSI-RSs correspond to V-CSI-RS or H-CSI-RS.

Afterward, the UE is assigned two feedbacks through Radio Resource Control (RRC) information formatted as shown in table 1.

TABLE 1

| First feedback information (Feedback 1) | Second feedback information (Feedback 2) |
|---|---|
| CSI-RS information: CSI-RS-1 Reporting mode Feedback timing PMI codebook information Etc. | CSI-RS information: CSI-RS-2 Reporting mode Feedback timing PMI codebook information Etc. |

In table 1, the RRC information on feedbacks 1 and 2 are assigned independently, and the PMI codebook information means the information on the set of precoding matrices capable of being used for corresponding feedback. If no PMI codebook information is included in the RRC information for feedback, it is regarded that all precoding matrices defined in the standard can be used for feedback. In table 1, the other information (etc.) may include feedback interval and offset information and interference measurement resource information.

It can be one of the channel state information report methods to configure plural feedbacks for plural transmit antennas of the FD-MIMO eNB and let the UE to report channel state information to the eNB as shown in FIG. 8.

This method is advantageous in that no extra implementation is necessary for the UE to generate the channel state information for FD-MIMO. However, the channel state information report method of FIG. 8 has a drawback in that it is difficult expect enough performance gain of the FD-MIMO system.

The reason for the lack of FD-MIMO system performance is because the UE cannot not provide CQI generated under the assumption of the precoding for FD-MIMO with the report of the channel state information on which the configuration of plural feedbacks using plural CSI-RSs as shown in FIG. 8.

More detailed description thereon is made hereinafter. In the case that a plural transmit antennas are arranged 2-dimensionally in the FD-MIMO system as shown in FIG. 7, both the vertical and horizontal direction precodings are applied for the UE. That is, the UE receives the signal to which the precodings corresponding to PMIH and PMIV are applied of FIG. 8 but not one of them. However, if the UE reports the CQIH, CQIV for the case of applying the precodings corresponding to PMIH and PMIV separately, the eNB does not receive the CQI for the case where both the vertical and horizontal direction precodings are applied and thus has to determine the CQI when both the precodings are applied. If the eNB determine a certain CQI for the case where both the vertical and horizontal direction precodings are applied, this may cause degradation of the system performance.

In addition to the method of FIG. 8 in which the UE generates and reports the vertical and horizontal feedback information independently, an embodiment of the present disclosure proposes a feedback method being implemented in such a way of recognizing the two CSI-RSs delivered to the UE AS the vertical and horizontal direction channel estimation reference signals of the 2-dimensional antenna structure and selecting the best precoding matrix among the precoding matrices designed suitable for the 2-dimensional antenna structure and XPOL antenna arrangement to report the corresponding rank information, precoding information, and CQI. That is, the present disclosure proposes a method for the UE to generate the feedback information for FD-MIMO using a set of precoding matrices designed to be suitable for the 2-dimensional antenna structure and XPOL and report the feedback information. In the present disclosure, the set of precoding matrices defined between the eNB and the UE may be referred to as codebook, and each precoding matrix of the codebook may be referred to as codeword.

In various embodiments of the present disclosure, the UE estimates channels using the two CSI-RSs in consideration of the 2-dimensional antenna arrangement, selects the best rank and precoding matrix from the codebook designed in consideration of the XPOL structure, and reports RI, PMI, and CQI generated based on the selected rank and precoding matrix.

As described above, the 2-dimensional XPOL antenna array of FIG. 7 is provided with total 32 antennas among which the first group of 16 antennas is arranged to have an angle of −45° to the positive direction of the X axis and the second group of the rest 16 antennas is arranged to having an angle of +45° to the positive direction of the X axis. At this time, the two antenna groups are arranged at the same position. Accordingly, the $N_{Rx} \times 16$ channel matrix $H_2$ between the second antenna group and the UE can be expressed as a scalar product of the $N_{Rx} \times 16$ channel matrix $H_1$ between the first antenna group and the UE as shown in equation (2).

$$H_2 = e^{j\Phi} H_1 \tag{2}$$

Accordingly, the $N_{Rx} \times 32$ channel matrix H for the 32 antennas forming the first and second antenna groups is expressed in the form of equation (3).

$$H = [H_1 \; e^{j\Phi} H_1] \tag{3}$$

A description is made of the method for selecting the best precoding matrix for the channel matrix of equation (3) in rank 1. In this case, the precoding matrix maximizing Signal to Noise Ratio (SNR) is selected using the method expressed by equation (4).

$$\hat{P} = \underset{p}{\arg\max} \|HP\| = \underset{p_1 p_2}{\arg\max} \left\| [H_1 \; e^{j\phi} H_1] \begin{bmatrix} P_1 \\ P_2 \end{bmatrix} \right\| = \underset{P_1 P_2}{\arg\max} \|H_1 P_1 + e^{j\phi} H_1 P_2\| \tag{4}$$

Here, $$P = \begin{bmatrix} P_1 \\ P_2 \end{bmatrix}$$

denotes 32×1 precoding matrix. $P_1$ and $P_2$ denote 16×1 beamforming vectors for forming the beams in specific directions in combination with the channel matrix. In equation (4), the precoding matrix maximizing SNR has to have the property of equation (5).

$$P_2 = e^{-j\Phi} P_1 \tag{5}$$

Accordingly, the precoding matrix for rank 1 to maximize SNR has to be structured in the form of equation (6).

$$P = \begin{bmatrix} P_1 \\ e^{j\Phi} P_1 \end{bmatrix} \tag{6}$$

That is, equation (6) shows that the good precoding matrix is designed to match the phases of the two antennas groups of the XPOL in forming the respective beams with the same beamforming vector.

By referencing the rank 1 precoding matrix design of equation (6), it is possible to see that the SNR of each transmission layer is maximized when equation (6) is applied per column of the precoding matrix for rank 1 or above. Through the above-described method, the rank 2 precoding matrix can be designed as equation (7).

$$P = \begin{bmatrix} P_1 & P_1' \\ e^{-j\Phi} P_1 & -e^{-j\Phi} P_1' \end{bmatrix} \tag{7}$$

In equation (7), $P_1$ and $P_1'$ are the same vector or orthogonal vectors. This is because it is known that the precoding matrix is designed to have the unitary matrix property to maximize SNR.

Due to the limitation of the feedback information amount available from the UE to the eNB, it is impossible to transmit the precoding matrix optimal mathematically to a specific channel matrix directly. Accordingly, in the real system, a set of predetermined number of precoding matrices is defined as a codebook available between the UE and the eNB such that the UE feeds back the index of a precoding matrix to the eNB.

In the case of designing the rank 1 codebook available for XPOL having N antennas in consideration of the rank 1 codebook structure of equation (6), the precoding matrix can be determined based on two indices in the codebook as shown in equation (8).

$$P(i_1, i_2) = W_1(i_1) W_2(i_2) \tag{8}$$

-continued where, $$W_1(i_1) = \begin{bmatrix} X(i_1) & 0 \\ 0 & X(i_1) \end{bmatrix},$$

$$X(i_1) = [P_1(i_1) \ldots P_M(i_1)],$$

$$P_m^{(i_1)} \in \{C_0, C_1, \ldots, C_{Q-1}\},$$

and $$W_2(i_2) = \frac{1}{\sqrt{2}} \begin{bmatrix} e_m \\ \alpha^k e_m \end{bmatrix},$$

$$\alpha = e^{-\frac{j2\pi}{K}},$$

$$i_2 = K(m-1) + k, m = 1, 2, \ldots, M, k = 0, 1, \ldots, K-1$$

Here, $c_q$ denotes a N/2×1 beamforming vector for N/2 antennas of the antenna group arranged at the same angle in XPOL under the assumption that Q beamforming vectors are available in equation (8). $e_m$ denotes a unitary vector having all zero elements with the exception of $m^{th}$ element having the value of 1 such that $P_m(i_1)$ as the $m^{th}$ column of the diagonal block matrix $X(i_1)$ $[P_1(i_1) \ldots P_M(i_1)]$ of $W_1(i_1)$ is selected as the beamforming vector. That is, the final precoding matrix obtained in combination based on the determination of index $(i_1, i_2)$ is expressed as equation (9) like equation (6).

$$P(i_1, i_2) = W_1(i_1)W_2(i_2) = \begin{bmatrix} P_m(i_1) \\ e^{-\frac{j2\pi}{K}k} P_m(i_1) \end{bmatrix}, \quad (9)$$

where $i_2 = K(m-1) + k$

The properties of index $(i_1, i_2)$ determining the precoding matrix are as follows.

First, $i_1$ indicates M beamforming vector candidates selectable for the current channel among all beamforming vectors of the codebook. Also, $i_2$ is used for selecting the best beamforming vector to be used with the current channel among the beamforming vector candidates indicated by $i_1$ and adjusting the phases of the antenna groups.

A method of designing the rank 1 codebook appropriate for XPOL having N antennas which has been described with reference to equations (8) and (9) may be extended to take rank 2 into consideration. That is, the precoding matrix in a rank 2 codebook may be determined with two indices as expressed by equation (10).

$$P(i_1, i_2) = W_1(i_1)W_2(i_2) \quad (10)$$

where, $$W_1(i_1) = \begin{bmatrix} X(i_1) & 0 \\ 0 & X(i_1) \end{bmatrix},$$

$$X(i_1) = [p_1(i_1) \ldots p_M(i_1)],$$

$$p_m(i_1) \in \{C_0, C_1, \ldots, C_{Q-1}\},$$

and $$W_2(i_2) = \frac{1}{\sqrt{2}} \begin{bmatrix} e_{m1} & e_{m2} \\ \alpha^k e_{m1} & -\alpha^k e_{m2} \end{bmatrix},$$

$$\alpha = e^{-\frac{j2\pi}{K}},$$

$$i_2 = K(m-1) + k,$$

$$m = f(m1, m2) m1 \in \{1, \ldots, M\},$$

$$m2 \in \{1, 2, \ldots, M\},$$

$$k = 0, 1, \ldots, K-1$$

In equation (10), m is determined by (m1, m2), and m1 and m2 are used to select a beam vector appropriate for each column of the precoding matrix. The final precoding matrix combined after the determination of the index $(i_1, i_2)$ is expressed as equation (11) like equation (7).

$$P(i_1, i_2) = W_1(i_1)W_2(i_2) = \begin{bmatrix} P_{m1}(i_1) & P_{m2}(i_1) \\ e^{-\frac{j2\pi}{K}k} P_{m1}(i_1) & -e^{-\frac{j2\pi}{K}k} P_{m2}(i_1) \end{bmatrix}, \quad (11)$$

$$i_2 = K(m-1) + k, m = f(m1, m2)$$

In designing the codebook of the precoding matrices, the rest part is to define a set of beamforming vectors $\{C_0, C_1, \ldots, C_{Q-1}\}$ and determined the relationship between $P_m(i_1)$ and $C_q$.

In an embodiment, Discrete Fourier Transform (DFT) beamforming vectors may be used to define the beamforming vector set $\{C_0, C_1, \ldots, C_{Q-1}\}$. That is, in order to define the beamforming vector set $\{C^0, C^1, \ldots, C^{Q-1}\}$, Q columns of Q×Q DFT matrix are selected to use first N/2 elements as $C_0, C_1, \ldots, C_{Q-1}$. The $q^{th}$ beamforming vector can be expressed as equation (12).

$$c_q = \begin{bmatrix} 1 & e^{\frac{j2\pi q}{Q}1} & e^{\frac{j2\pi q}{Q}2} & \ldots & e^{\frac{j2\pi q}{Q}(N/2)} \end{bmatrix} \quad (12)$$

As an exemplary method of defining the relationship between $P_m(i_1)$ and $C_q$, it can be considered to include the beamforming vector having M consecutive indices in $X(i_1) = [P_1(i_1) \ldots P_M(i_1)]$ and map the starting value of the M consecutive indices to $i_1$. Assuming that $i_1$ is made up of 4 bits to express a value in the range from 0 to 15 and Q=32 and M=4, the relationship between $P_m(i_1)$ and $C_q$ which is defined to include the beamforming vector having 4 consecutive indices in $X(i_1)$ and 32 vectors are included evenly for 16 $i_1$ is expressed as equation (13).

$$P_m(i_1) = C_{(2i_1 + m - 1) \bmod 32}, i_1 = 0, 1, \ldots, 15, m = 0, 1, 2, 3 \quad (13)$$

Execution (13) can be expressed in more detail as equation (14).

$$X(0) = [c_0, c_1, c_2, c_3], X(1) = [c_2, c_3, c_4, c_5], X(2) = [c_4, c_5, c_6, c_7], X(3) = [c_6, c_7, c_8, c_9], \ldots, X(13) = [c_{26}, c_{27}, c_{28}, c_{29}], X(14) = [c_{28}, c_{29}, c_{30}, c_{31}a], X(15) = [c_{30}, c_{31}, c_0, c_1] \quad (14)$$

In another example, assuming that $i_1$ is made up of 5 bits to express a value in the range from 0 to 31 and Q=64 and M=2, the relationship between $P_m(i_1)$ and $C_q$ which is defined to include the beamforming vector having 2 consecutive indices in $X(i_1)$ and 64 vectors are included evenly for 32 $i_1$ is expressed as equation (15).

$$P_m(i_1) = c_{(2i_1 + m - 1) \bmod 32}, i_1 = 0, 1, \ldots, 31, m = 0, 1 \quad (15)$$

This can be expressed as equation (16).

$$X(0) = [c_0, c_1], X(1) = [c_2, c_3], X(2) = [c_4, c_5], X(3) = [c_6, c_7], \ldots, X(30) = [c_{60}, c_{61}], X(31) = [c_{62}, c_{63}] \quad (16)$$

Once the codebook using the DFT beamforming vectors and relationship between $P_m(i_1)$ and $C_q$ has been defined based on equation (8), the UE can estimate channels of the N transmit antennas arranged 2-dimensionally based on the two CSI-RSs and generate to PMIs $i_1$ and $i_2$ and CQI defining the best rank and precoding matrix. Afterward, if the UE reports the determined rank, $i_1$ and $i_2$, and CQI at the determined timing, the eNB may check the channel information about the UE by referencing the predefined codebook and use the checked information for data scheduling associated with the UE. Here, the rank, $i_1$ and $i_2$, and CQI may be carried along with uplink data at the same timing or along with uplink control channels at independent timings. Particularly when $i_1$ and $i_2$ are reported at independent timings, it is more efficient to transmit $i_2$ at an interval shorter than that of $i_1$. That is, $i_1$ is reported at a relatively long interval to notify the eNB of the set of available beamforming vectors, and $i_2$ is reported at a relatively short interval to select the beamforming vector most suitable for the actual fading channel and match the phases of the antenna groups. At this time, $i_t$ is used to indicate M beamforming vector candidates selectable for the current channel among all the beamforming vectors in the codebook, and $i_2$ is used to select the beamforming vector to be used actually and adjust the phases of the antenna groups.

A description is made of the UE operation in the case that the codebook of using the DFT beamforming vectors and relationship between $P_m(i_1)$ and $C_q$ is defined based on equation (8) according to the various embodiments of the present disclosure.

Figure 9:
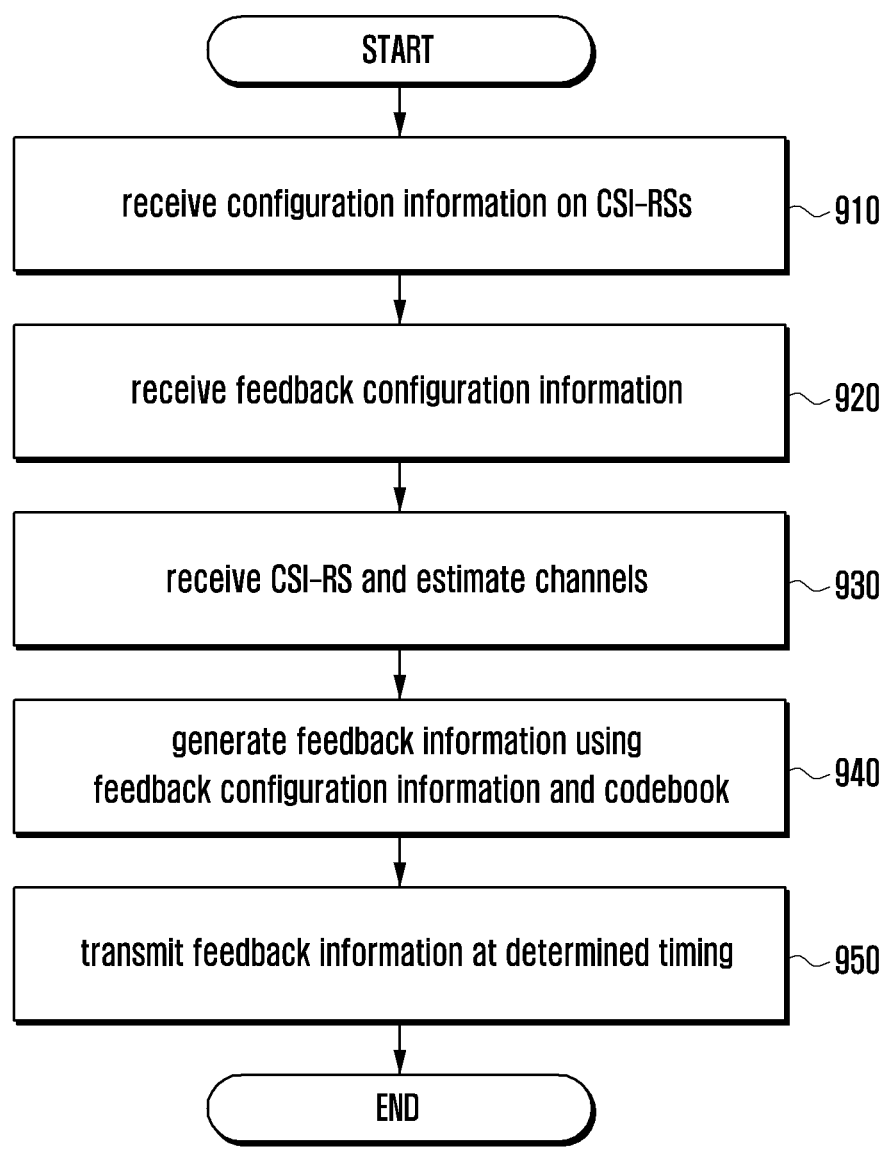
FIG. 9 illustrates a flowchart for the operation procedure of the UE according to an embodiment of the present disclosure.

FIG. 9 illustrates a flowchart for the operation procedure of the UE according to an embodiment of the present disclosure.

Referring to FIG. 9, the UE receives the configuration information on two CSI-RSs for use in vertical and horizontal direction channel estimation at step 910. The UE checks the information on the numbers of ports of respective CSI-RSs, CSI-RS transmission timings and resource locations, sequences, and transmit power, entirely or partially based on the received configuration information.

Next, the UE checks the two CSI-RSs-based feedback configuration information at step 920. According to the various embodiments of the present disclosure, the two CSI-RSs-based feedback configuration may be made up of all or some of the RRC information as shown in table 2.

TABLE 2

| Feedback Configuration |
| --- |
| First channel information (horizontal channel): CSI-RS-1 |
| Second channel information (vertical channel): CSI-RS-2 |
| Reporting (feedback) mode |
| PMI codebook information |
| Etc . . . |

Referring to table 2, the feedback configuration is of the two CSI-RSs (CSI-RS-1 and CSI-RS 2) and includes the information on the matches of the respective CSI-RSs to the first and second channel information (first channel information (horizontal channel): CSI-RS and second channel information (vertical channel): CSI-RS-2). Although the present embodiment is directed to the exemplary case where the first and second channel information correspond to the horizontal and vertical direction CSI-RSs, the present disclosure is not limited thereto but embodied by matching the first and second channel information to the respective vertical and horizontal direction CSI-RSs.

Referring to table 2, the feedback configuration includes the feedback mode (reporting or feedback mode) information indicating the types of feedback information to be generated and fed back by the UE. That is, the feedback mode information is of instructing the UE to estimate the channels established in association with the two-dimensionally arranged N transmit antennas based on the CSI-RS-1 and CSI-RS-2 so as to generate and report two PMIs, $i_1$ and $i_2$, and CQI defining optimal rank and precoding matrix to the eNB. The feedback mode information also may include the information on whether the $i_2$ and CQI has to be reported per subband or as single wideband information.

The PMI codebook information denotes the information on the set of precoding matrices that can be used in the current channel environment in the codebook. If the PMI codebook information is not included in the RRC information for feedback, the UE may assume that the every feedback can be used for notifying all available precoding matrices in the defined codebook. In table 2, the etc. information may include the feedback interval and offset information for periodic feedback and interference measurement resource information.

At step 930, the UE receives the CSI-RSs checked at step 910. The UE estimates the channels between $N=N_H N_V$ transmit antennas of the eNB and $N_{Rx}$ receive antennas arranged 2-dimensionally. Here, $N_H$ and $N_V$ denote the numbers of horizontal and vertical direction CSI-RSs antenna ports.

For example, assuming $N_{Rx} \times N_H$ channel matrix estimated using the CSI-RS-1 is $$H_H = \begin{bmatrix} h_1(H) \\ \vdots \\ h_{N_{Rx}}(H) \end{bmatrix}$$

and $N_{Rx} \times N_V$ channel matrix estimated using CSI-RS-2 is $$H_V = \begin{bmatrix} h_1(V) \\ \vdots \\ h_{N_{Rx}}(V) \end{bmatrix},$$

the $N_{Rx} \times (N_H N_V)$ channel matrix for $N=N_H N_V$ 2-dimensional transmit antennas can be expressed as equation (17).

$$H_{HV} = \gamma \begin{bmatrix} h_1(H) \otimes h_1(V) \\ \vdots \\ h_{N_{Rx}}(H) \otimes h_{N_{Rx}}(V) \end{bmatrix} \quad (17)$$

In equation (17), $\gamma$ denotes a scalar value necessary for converting the influence of the horizontal and vertical antennas virtualization to a channel value for all of the 2-dimensional antennas, which may be received from the eNB separately or set to 1 pre-calculated in estimating channels based on CSI-RSs. Also, $\otimes$ denotes Kronecker product of matrices, and the Kronecker product between matrices A and B is expressed as equation (18).

$$A \otimes B = \begin{bmatrix} a_{11}B & \cdots & a_{1n}B \\ \vdots & \ddots & \vdots \\ a_{m1}B & \cdots & a_{mn}B \end{bmatrix} \quad (18)$$

In equation (18), $$A = \begin{bmatrix} a_{11} & \cdots & a_{1n} \\ \vdots & \ddots & \vdots \\ a_{m1} & \cdots & a_{mn} \end{bmatrix}.$$

Equation (18) shows that the channel between the $N=N_H N_V$ transmit antennas of the eNB and the $N_{Rx}$ receive antennas that are arranged 2-dimensionally is equivalent to the channel established by Kronecker product per receive antenna for the vertical and horizontal channels estimated based on the vertical and horizontal direction CSI-RSs, in the case that the numbers of horizontal and vertical direction CSI-RS antenna ports are $N_H$ and $N_V$ respectively.

After estimating the channels between the $N=N_H N_V$ transmit antennas of the eNB and the $N_{Rx}$ receive antennas that are arranged 2-dimensionally at step 930, the procedure goes to step 940. At step 940, the UE generates the feedback information including rank, PMI, $i_1$ and $i_2$, and CQI using feedback configuration received at step 920 and the codebook defined as above. Next, the UE transmits the feedback information at the corresponding timings according to the feedback configuration received from the eNB at step 950 and completes the procedure of generating and reporting the channel feedback information in consideration of 2-dimensional arrangement.

Figure 10:
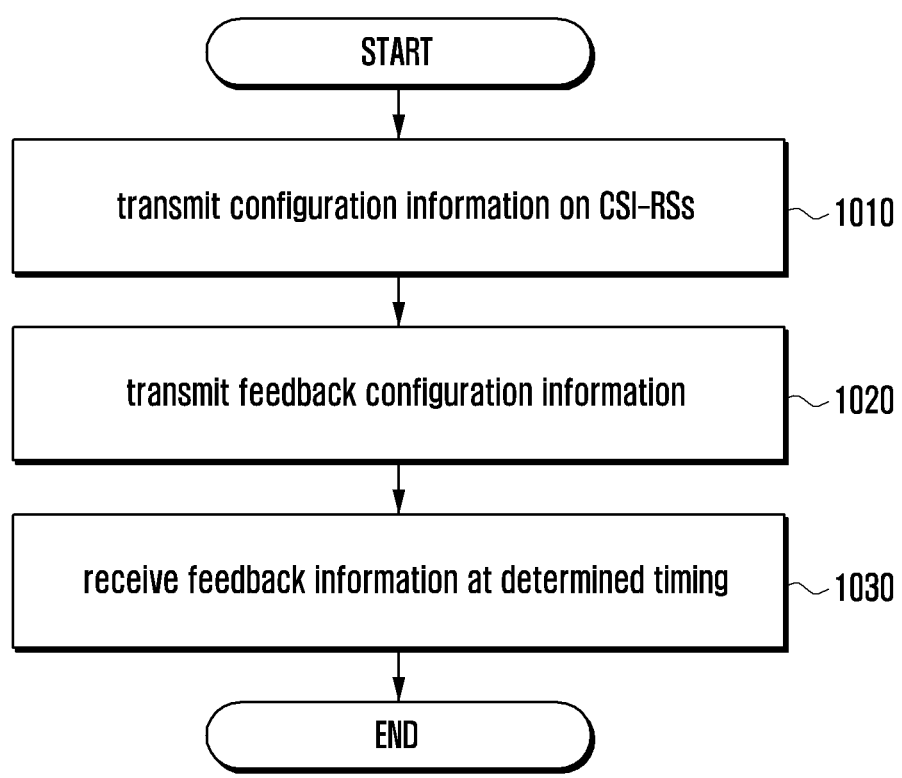
FIG. 10 illustrates a flowchart for the operation procedure of the eNB according to an embodiment of the present disclosure.

FIG. 10 illustrates a flowchart for the operation procedure of the eNB according to an embodiment of the present disclosure.

Referring to FIG. 10, the eNB sends the UE the configuration information on the two CSI-RSs for use in vertical and horizontal direction channel estimation at step 1010. The configuration information also includes at least one of a number of CSI-RS ports, CSI-RS transmission timings and resource locations, sequences, and transmit power.

Next, the eNB sends the UE the feedback configuration information on the two CSI-RSs at step 1020. According to the various embodiments of the present disclosure, the feedback configuration associated with the two CSI-RSs includes a whole or a part of the RRC information as shown in table 2.

Next, the eNB sends the UE the two CSI-RSs at step 1030. The UE estimates the channels between $N=N_H N_V$ transmit antennas of the eNB and $N_{Rx}$ receive antennas arranged 2-dimensionally. Here, $N_H$ and $N_V$ denote the numbers of horizontal and vertical CSI-RS antenna ports respectively.

Assuming $N_{Rx} \times N_H$ channel matrix estimated based on the CSI-RS-1 is $$H_H = \begin{bmatrix} h_1(H) \\ \vdots \\ h_{N_{Rx}}(H) \end{bmatrix}$$

and the $N_{Rx} \times N_V$ channel matrix estimated based on the CSI-RS-2 is $$H_V = \begin{bmatrix} h_1(V) \\ \vdots \\ h_{N_{Rx}}(V) \end{bmatrix},$$

the $N_{Rx} \times (N_H N_V)$ channel matrix for $N=N_H N_V$ 2-dimensional transmit antennas can be expressed as equation (17).

The UE estimates channels between the $N=N_H N_V$ transmit antennas of the eNB and the $N_{Rx}$ receive antennas that are arranged 2-dimensionally. The UE generates the feedback information including rank, PMI ($i_1$ and $i_2$) and CQI using the feedback configuration and the codebook defined according to an embodiment of the present disclosure. Afterward, the UE sends the eNB the feedback information at corresponding feedback timings according to the feedback configuration transmitted by the eNB.

The eNB receives the feedback information transmitted by the UE for use in determining the channel state between the UE and the eNB at step 1030.

Further embodiments of the present disclosure are similar to the embodiments described above in that the UE estimates channels based on two CSI-RSs and selects the best rank and precoding matrix from the codebook designed in consideration of the XPOL structure to report the RI, PMI, and CQI generated in correspondence to the selected rank and precoding matrix. However, these further embodiments differ in terms of using the codebook more suitable for the FD-MIMO system by taking the 2-dimensional antenna arrangement in to consideration as well as XPPOL structure in designing the codebook. These embodiments obviate the need of considering extra 2-dimensional channel in the CSI-RS channel estimation process.

As described with reference to FIG. 7, in the case of measuring the radio channels using the horizontal and vertical CSI-RSs, the horizontal CSI-RS is used to acquire the information on the horizontal angle between the UE and the transmit antennas of the eNB as denoted by reference number 301, and the vertical CSI-RS is used to acquire the information on the vertical angle between the UE and the transmit antennas of the eNB as denoted by reference number 320. This shows that it is natural to select the best horizontal and vertical beamforming vectors independently and combine the selected horizontal and vertical beamforming vectors into the beamforming vector oriented to the UE located at a certain position within the cell to apply the beamforming vector to the 2-dimensional antennas. That is, assuming that the best horizontal and vertical beamforming vectors are $P_H$ and $P_V$ respectively for the horizontal and vertical direction CSI-RSs, the best beamforming vector to be applied to the corresponding 2-dimensional antenna arrangement is expressed as $P_{NV} = P_H \otimes P_V$.

If the rank 1 codebook is designed in consideration of the 2-dimensional arrangement and XPOL antenna structure according to the various embodiments of the present disclosure, the precoding matrix belonging to the codebook may be expressed using three indices as equation (19).

$$P(i_{11}, i_{12}, i_2) = W_1(i_{11}, i_{12}) W_2(i_2) \quad (19)$$

where $$W_1(i_{11}, i_{12}) = \begin{bmatrix} X_H(i_{11}) \otimes X_V(i_{12}) & 0 \\ 0 & X_H(i_{11}) \otimes X_V(i_{12}) \end{bmatrix},$$

$$X_H(i_{11}) = [p_1(i_{11}) \ \ldots \ p_{M_1(i_{11})}],$$

-continued $$X_V(i_{12}) = [q_1(i_{12}) \ldots q_{M_2}(i_{12})],$$

$$P_{m_1}(i_{11}) \in C_H, q_{m_2}(i_{12}) \in C_V$$

and $$W_2(i_2) = \frac{1}{\sqrt{2}} \begin{bmatrix} e_m \\ \alpha^k e_m \end{bmatrix},$$

$$\alpha = e^{-\frac{j2\pi}{K}},$$

$$i_2 = K(m-1) + k,$$

$$m = 1, 2, \ldots, M,$$

$$k = 0, 1, \ldots, K-1$$

Here, $C_H$ and $C_V$ denotes the sets of beamforming vectors available for use in the horizontal and vertical directions respectively. Referring to FIG. 7, in the 2-dimensional antenna structure having 4 XPOL antenna pairs in the horizontal and 4 XPOL antenna pairs in the vertical directions, $C_H$ and $C_V$ are both the sets of beamforming vectors having a size of 4×1. In an example, $C_H$ and $C_V$ may be the DFT beamforming vector sets having the size of 4×1. In another example, if the 2-dimensional antennas are made up of 4 horizontally arranged and 2 vertical arranged XPOL antenna pairs, $C_H$ includes the 4×1 beamforming vectors as shown in FIG. 7 and $C_V$, includes the 2×1 beamforming vectors. The numbers of the beamforming vectors included in $C_H$ and $C_V$ may be determined depending on the sizes of the beamforming vectors included therein. For example, a beamforming vector set may include $Q_{4\times1}$ 4×1 beamforming vectors or $Q_{2\times1}$ 2×1 beamforming vectors. Here, $Q_{4\times1}$ $Q_{2\times1}$ may be equal to or different from each other. In equation 19, $M=M_1M_2$ and $M_1$ and $M_2$ may be defined differently depending on the size of the beamforming vectors included in $C_H$ and $C_V$. In alternative case, $M_1$ and $M_2$ may be delivered from the eNB to the UE through higher layer signaling or determined by sending a preferred value to the eNB.

In equation (19), $e_m$ denotes the unitary vector of which all elements are set to 0 with the exception of the $m^{th}$ element set to 1 and which makes it possible to select the $m^{th}$ column of the block diagonal matrix $X_H(i_{11}) \otimes X_V(i_{12})$ of $W_1(i_{11}, i_{12})$ as the beamforming vector. That is, the final precoding matrix obtained through combination in the state that index $(i_{11}, i_{12}, i_2)$ has been determined is expressed as equation (20).

$$P(i_{11}, i_{12}, i_2) = W_1(i_{11}, i_{12})W_2(i_2) = \begin{bmatrix} p_{m1}(i_{11}) \otimes q_{m2}(i_{12}) \\ e^{-\frac{j2\pi}{K}k} p_{m1}(i_{11}) \otimes q_{m2}(i_{12}) \end{bmatrix}, \quad (20)$$

where $i_2 = K(m-1) + k, m + M_1(m_1 - 1) + m_2$

The rank 1 codebook design method described with reference to equations (19) and (20) may be extended to take rank 2 into consideration without difficulty. That is, the precoding matrix in a rank 2 codebook may be determined with two indices as expressed by equation (21).

$$P(i_{11}, i_{12}, i_2) = W_1(i_{11}, i_{12})W_2(i_2) \quad (21)$$

where, $$W_1(i_{11}, i_{12}) = \begin{bmatrix} XH(i_{11}) \otimes X_V(i_{12}) & 0 \\ 0 & X_H(i_{11}) \otimes X_V(i_{12}) \end{bmatrix},$$

$$X_H(i_{11}) = [P_1(i_{11}) \ldots P_{M1}(i_{11})],$$

$$X_V(i_{12}) = [q_1(i_{12}) \ldots q_{M2}(i_{12})],$$

$$P_{m1}(i_{11}) \in C_H, q_{m2}(i_{12}) \in C_V$$

and $$W_2(i_2) = \frac{1}{\sqrt{2}} \begin{bmatrix} e_{l1} & e_{l2} \\ \alpha^k e_{l1} & -\alpha^k e_{l2} \end{bmatrix},$$

$$\alpha = e^{-\frac{j2\pi}{K}},$$

$$i_2 = K(m-1) + k,$$

$$m = f(l1, l2),$$

$$l1 \in \{1, \ldots, M\},$$

$$l2 \in \{1, 2, \ldots, M\},$$

$$k = 0, 1, \ldots, K-1$$

In equation (21), m is a value determined by (l1, l2), and l1 and l2 are used to select the beam vector appropriate for each column of the precoding matrix.

The index $(i_{11}, i_{12}, i_2)$ for use in determining the precoding matrix has the following characteristics.

The index $i_{11}$ is responsible for indicating $M_1$ beamforming vector candidates selectable for the current channel among the beamforming vectors included in the horizontal direction codebook. The index $i_{12}$ is responsible for indicating $M_2$ beamforming vector candidates selectable for the current channel among the beamforming vectors included in the vertical direction codebook. Finally, the index $i_2$ is responsible for selecting the best beamforming vector suitable for the current channel among the Kronecker protect results all available for the horizontal and vertical beamforming vector candidates indicated by $i_{11}$ and $i_{12}$ and adjusting the phases of the different antenna groups.

The rest part of designing the codebook of the precoding matrices is to define a set of beamforming vectors and to determine $p_{m1}(i_{11})$ and $q_{m2}(i_{12})$ and beamforming vectors available for the respective horizontal and vertical directions. The set of beamforming vectors may be of the DFT beamforming vectors in horizontal and vertical directions as described in the various embodiments or obtained using the relationship between $p_m(i_1)$ and $c_q$ in the horizontal and vertical direction as the method of defining $p_{m1}(i_{11})$ and $q_{m2}(i_{12})$ as described in the various embodiments.

In the case that the codebook is defined based on equation (19), the UE can estimate horizontal and vertical channels using the two CSI-RSs and generate the best rank, three indices $(i_{11}, i_{12}, i_2)$ defining the precoding matrix, and CQI corresponding to the estimated channels. The UE may transmit the rank, indices $(i_{11}, i_{12}, i_2)$, and CQI to the eNB at determined timings. The eNB may check the channel information associated with the UE by referencing the defined codebook for use in data scheduling for the UE. Here, the rank, indices $i_{11}, i_{12}$, and $i_2$, and CQI may be transmitted along with uplink data at the same timing or through independent uplink control channels at different timings. Particularly when $i_{11}, i_{12}, i_2$ are reported at different timings, it is more effective to transmit $i_2$ at an interval shorter than $i_{11}$ and $i_{12}$ transmission interval. At this time, $i_{11}$ and $i_{12}$ are responsible for indicating the beamforming vector candidates selectable for the current channel among all the beamforming vectors included in the codebook, and $i_2$ is responsible for selecting the beamforming vector to be used actually and adjusting the phases of antenna groups.

In the case that the codebook is defined based on equation (19) according to the various embodiments of the present disclosure, the UE operates as described with reference to FIG. 9.

Referring to FIG. 9, the UE receives the configuration information on the two CSI-RSs for vertical and horizontal direction channel estimations at step 910. The UE checks the information on the numbers of ports of respective CSI-RSs, CSI-RS transmission timings and resource locations, sequences, and transmit power, entirely or partially based on the received configuration information.

Next, the UE checks the two CSI-RSs-based feedback configuration information at step 920. According to the various embodiments of the present disclosure, the two CSI-RSs-based feedback configuration may be made up of all or some of the RRC information as shown in table 2.

Referring to table 2, the feedback mode (reporting or feedback mode) information is reported for use in estimating channels on the basis of the CSI-RS-1 and CSI-RS-2 and reporting the best rank, three PMIs ($i_{11}$, $i_{12}$, and $i_2$) indicating the best precoding matrix, and CQI generated in correspondence to the estimation result to the eNB in the various embodiments of the present disclosure. Here, the CQI is generated under the assumption of using the precoding matrix defined by equation (19) in consideration of the most recently reported three PMI values.

At step 930, the UE receives the CSI-RSs checked at step 910. The UE estimates the horizontal and vertical direction channels. At step 940, the UE generates the feedback information including rank, PMI ($i_{11}$, $i_{12}$, and $i_2$), and CQI using the feedback configuration received at step 920 and the codebook.

The UE transmits the feedback information at the corresponding timings according to the feedback configuration received from the eNB at step 950 and completes the procedure of generating and reporting the channel feedback information in consideration of 2-dimensional arrangement.

A description is made of the eNB operation, in the case that the codebook is defined based on equation (19) according to the various embodiments of the present disclosure, hereinafter with reference to FIG. 10.

Referring to FIG. 10, the eNB sends the UE the configuration information in association with two CSI-RSs for use in vertical and horizontal channel estimations at step 1010. The configuration information may include at least one of numbers of CSI-RSs ports, CSI-RS transmission timings and resource locations, sequences, and transmit power information.

Next, the eNB sends the UE the feedback configuration information on the two CSI-RSs at step 1020. According to the various embodiments of the present disclosure, the feedback configuration associated with the two CSI-RSs includes a whole or a part of the RRC information as shown in table 2.

Next, the eNB sends the UE the two CSI-RSs at step 1030. The UE estimates the horizontal and vertical direction channels. The UE generates the feedback information including rank, PMI ($i_{11}$, $i_{12}$, and $i_2$), and CQI based on the feedback configuration and the codebook defined according to the various embodiments of the present disclosure. Afterward, the UE transmits the feedback information to the eNB at the corresponding timings according to the feedback configuration provided by the eNB.

The eNB receives the feedback information transmitted by the UE for use in determining the channel state between the UE and the eNB at step 1030.

Figure 11:
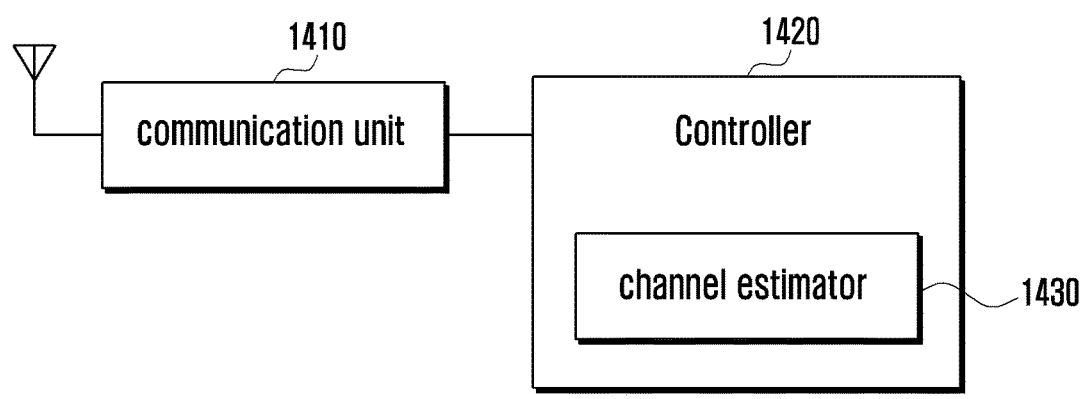
FIG. 11 illustrates a block diagram of a configuration of the UE according to an embodiment of the present disclosure.

FIG. 11 illustrates a block diagram of a configuration of the UE according to an embodiment of the present disclosure. As shown in FIG. 11 the UE includes a communication unit 1410 and a controller 1020.

The communication unit 1410 is responsible for transmitting and receiving data to and from the outside (e.g. eNB). Here, the communication unit 1410 may transmit the feedback information to the eNB for use in the FD-MIMO mode under the control of the controller 1420.

The controller 1420 controls the states and operations of the components of the UE. In detail, the controller 1420 generates the feedback information for FD-MIMO based on the information provided by the eNB. The controller 1420 controls the communication unit 1410 to transmit the feedback information to the eNB according to the timing information provided by the eNB. For this purpose, the controller 1420 may include a channel estimator 1430.

The channel estimator 1430 determines feedback information to be reported based on the CSI-RSs and feedback configuration information transmitted by the eNB and estimates channels based on the received CSI-RSs.

Although FIG. 11 is directed to an exemplary case whether the UE is made up of the communication unit 1410 and the controller 1420, the present disclosure is not limited thereto but may be embodied by further including various components necessary for supporting the functions of the UE. For example, the UE may further include a display unit for displaying the operation state of the UE, an input unit for receiving the user input made for executing a certain function, and a storage unit for storing data generated in the UE. Although FIG. 11 is directed to an exemplary case whether the channel estimator 1430 is an independent function block, the present disclosure is not limited thereto. For example, the controller 1420 may be configured so as to be responsible for the functions of the channel estimator 1430.

In this case, the controller 1420 may control the communication unit 1410 to receive the configuration information on at least two reference signals from the eNB. The controller 1420 also may control the communication unit 1410 to receive the feedback configuration information from the eNB for use in measuring the at least two reference signals and generating the feedback information on the basis of the measurement result.

The controller 1420 measures the at least two reference signals received by the communication unit 1410 and generates the feedback information based on the feedback configuration information. The controller 1420 controls the communication unit 1410 to transmit the feedback information to the eNB at the feedback timings determined based on the feedback configuration information.

Figure 12:
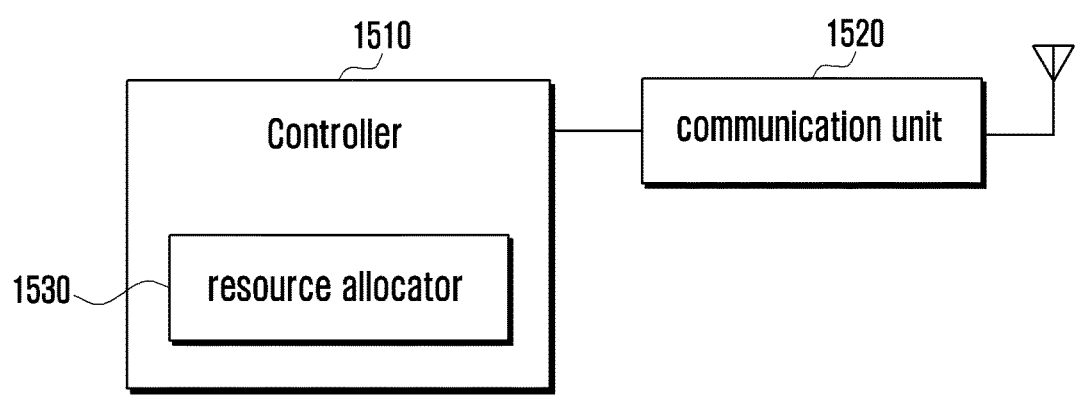
FIG. 12 illustrates a block diagram of a configuration of the eNB according to an embodiment of the present disclosure.

FIG. 12 illustrates a block diagram of a configuration of the eNB according to an embodiment of the present disclosure. As shown in FIG. 11, the eNB includes a controller 1510 and a communication unit 1520.

The controller 1510 controls the states and operations of the components of the eNB. In detail, the controller 1510 allocates CSI-RS resources for horizontal and vertical component channel estimations to the UE and notifies the UE of the feedback information and feedback timings. For this purpose, the controller may further include a resource allocator 1530.

The resource allocator 1530 allocates CSI-RS resources in order for the UE to estimate vertical and horizontal component channels and transmits the CSI-RSs using the corresponding resources. The resource allocator 1530 also generates the feedback configuration and feedback timing for the UE to perform feedback without collision and receives and interprets the feedback information at the corresponding timings.

The communication unit 1520 is responsible for transmitting/receiving data, reference signals, and feedback information to/from the UE. Here, the communication unit 1520 transmits the CSI-RSs to the UE using the resource allocated under the control of the controller 1510 and receives the feedback information on the channels from the UE.

Although FIG. 12 is directed to an exemplary case where the resource allocator 1530 is and independent function block, the present disclosure is not limited thereto. For example, the controller 1510 may be configured so as to be responsible for the functions of the resource allocator 1530.

In this case, the controller 1510 may control the communication unit 1520 to transmit the configuration information on at least two reference signals to the UE and measure the at least two reference signals. The controller 1510 also may control the communication unit 1520 to transmit to the UE the feedback configuration information for use in generating the feedback information based on the measurement result.

The controller 1510 also may control the communication unit 1520 to transmit the at least two reference signals to the UE and receive the feedback information transmitted by the UE at the feedback timings determined based on the feedback information.

As described above, the feedback information transmission/reception method of the present disclosure is advantageous in terms of preventing the eNB having a plurality of transmit antennas such as FD-MIMO from allocating excessive radio resource for CSI-RS transmission such that the UE is capable of measuring channels associated with the plural transmit antennas and reporting the feedback information generated based on the measurement result to the eNB effectively.

Also, the feedback information transmission/reception method of the present disclosure is capable of preventing the eNB having a plurality of transmit antennas for FD-MIMO from allocation excessive radio resource for CSI-RS transmission allowing the UE to measure the channels of the plural transmit antennas and reporting feedback information based on the measurement result efficiently.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for feedback information transmission by a terminal in a mobile communication system, the method comprising:
    receiving reference signal (RS) configuration information on at least two reference signals and feedback configuration information from a base station, the feedback configuration information including precoding matrix indicator (PMI) codebook information;
    receiving the at least two reference signals from the base station based on the RS configuration information;
    measuring the received at least two reference signals;
    generating feedback information based on the measuring according to the feedback configuration information; and
    transmitting the feedback information to the base station,
    wherein the at least two reference signals are respectively associated with first and second antenna groups of the base station.

2. The method of claim 1, wherein the feedback information comprises a Rank Indicator (RI), a Precoding Matrix Indicator (PMI), and a Channel Quality Indicator (CQI), the PMI being generated by referencing a codebook defined based on the first and second antenna groups.

3. The method of claim 2, wherein the codebook is defined based on a first index indicating a beamforming vector selectable among beamforming vectors for the first antenna group, a second index indicating a beamforming vector selectable among beamforming vectors for the second antenna group, and a third index indicating a beamforming vector to be used actually.

4. The method of claim 3, wherein the feedback information comprises the first to third indices selected based on the PMI to the base station.

5. The method of claim 2, wherein the CQI is determined depending on the PMI generated based on the codebook.

6. The method of claim 1, wherein the feedback information comprises rank indicators generated in correspondence to the at least two reference signals respectively, precoding matrix indicators generated in correspondence to the at least two reference signals respectively, and channel quality indicators generated in correspondence to the precoding matrix indicators respectively.

7. A method for feedback information reception by a base station in a mobile communication system, the method comprising:
    transmitting reference signal (RS) configuration information on at least two reference signals and feedback configuration information to a terminal, the feedback configuration information including precoding matrix indicator (PMI) codebook information;
    transmitting the at least two reference signals to the terminal according to the RS configuration information; and
    receiving feedback information generated based on the feedback configuration information from the terminal,
    wherein the at least two reference signals are respectively associated with first and second antenna groups of the base station.

8. The method of claim 7, wherein the feedback information comprises a Rank Indicator (RI), a Precoding Matrix Indicator (PMI), and a Channel Quality Indicator (CQI), the PMI being generated by referencing a codebook defined based on first and second antenna groups.

9. The method of claim 8, wherein the codebook is defined based on a first index indicating a beamforming vector selectable among beamforming vectors for the first antenna group, a second index indicating a beamforming vector selectable among beamforming vectors for the second antenna group, and a third index indicating a beamforming vector to be used actually.

10. The method of claim 9, wherein the feedback information comprises the first to third indices selected based on the PMI.

11. The method of claim 8, wherein the CQI is determined depending on the PMI generated based on the codebook.

12. The method of claim 7, wherein the feedback information comprises rank indicators generated in correspondence to the at least two reference signals respectively, precoding matrix indicators generated in correspondence to the at least two reference signals respectively, and channel quality indicators generated in correspondence to the precoding matrix indicators respectively.

13. A terminal for transmitting feedback information in a mobile communication system, the terminal comprising:
one or more antennas; and
a controller configured to:
control to receive, via the one or more of the antennas, reference signal (RS) configuration information on at least two reference signals and feedback configuration information from a base station and, afterward, to receive, via the one or more of the antennas, the at least two reference signals from the base station based on the RS configuration information, the feedback configuration information including precoding matrix indicator (PMI) codebook information,
measure the received at least two reference signals,
generate the feedback information based on the measuring according to the feedback configuration information, and
control to transmit, via the one or more of the antennas, the feedback information to the base station,
wherein the at least two reference signals are respectively associated with first and second antenna groups of the base station.

14. The terminal of claim 13, wherein the feedback information comprises a Rank Indicator (RI), a Precoding Matrix Indicator (PMI), and a Channel Quality Indicator (CQI); and the controller is configured to generate the PMI by referencing a codebook defined based on a first index indicating a beamforming vector selectable among beamforming vectors for the first antenna group, a second index indicating a beamforming vector selectable among beamforming vectors for the second antenna group, and a third index indicating a beamforming vector to be used actually.

15. The terminal of claim 14, wherein the controller is configured to control to transmit the feedback information including the first to third indices selected based on the PMI, or to generate the CQI based on the PMI generated based on the codebook.

16. The terminal of claim 13, wherein the feedback information comprises rank indicators generated in correspondence to the at least two reference signals respectively, precoding matrix indicators generated in correspondence to the at least two reference signals respectively, and channel quality indicators generated in correspondence to the precoding matrix indicators respectively.

17. A base station for receiving feedback information in a mobile communication system, the base station comprising:
a plurality of antennas; and
a controller configured to control to transmit, via the plurality of antennas, reference signal (RS) configuration information on at least two reference signals and feedback configuration information to a terminal and, afterward, to transmit, via the plurality of antennas, the at least two reference signals to the terminal according to the RS configuration information, the feedback configuration information including precoding matrix indicator (PMI) codebook information; and to receive, via the plurality of antennas, the feedback information generated based on the feedback configuration information from the terminal,
wherein the at least two reference signals are respectively associated with first and second antenna groups of the base station.

18. The base station of claim 17, wherein the feedback information comprises a Rank Indicator (RI), a Precoding Matrix Indicator (PMI), and a Channel Quality Indicator (CQI), the PMI being generated by referencing a codebook defined based on a first index indicating a beamforming vector selectable among beamforming vectors for the first antenna group, a second index indicating a beamforming vector selectable among beamforming vectors for the second antenna group, and a third index indicating a beamforming vector to be used actually.

19. The base station of claim 18, wherein the feedback information comprises the first to third indices selected based on the PMI, or the CQI is determined depending on the PMI generated based on the codebook.

20. The base station of claim 17, wherein the feedback information comprises rank indicators generated in correspondence to the at least two reference signals respectively, precoding matrix indicators generated in correspondence to the at least two reference signals respectively, and channel quality indicators generated in correspondence to the precoding matrix indicators respectively.

* * * * *